United States Patent
Molin et al.

(10) Patent No.: US 9,674,414 B1
(45) Date of Patent: Jun. 6, 2017

(54) CAMERA MODULE HAVING COMPACT CAMERA SUBASSEMBLY INSERTABLE INTO THE CAMERA HOUSING

(71) Applicant: Bendix Commercial Vehicle Systems LLC, Elyria, OH (US)

(72) Inventors: Hans M. Molin, Mission Viejo, CA (US); Lenny T. Tan, Diamond Bar, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 14/956,704

(22) Filed: Dec. 2, 2015

(51) Int. Cl.
*H04N 5/225* (2006.01)
*G02B 7/02* (2006.01)

(52) U.S. Cl.
CPC ............ *H04N 5/2254* (2013.01); *G02B 7/02* (2013.01); *H04N 5/2252* (2013.01); *H04N 5/2253* (2013.01); *H04N 5/2257* (2013.01)

(58) Field of Classification Search
CPC ............... H04N 5/2257; G02B 13/001; H01L 27/14618; H04M 1/0264
See application file for complete search history.

(56) References Cited

U.S. PATENT DOCUMENTS

| | | | |
|---|---|---|---|
| 6,654,187 B2 | 11/2003 | Ning | |
| 8,482,665 B2* | 7/2013 | Jeon | H04N 5/2257 348/149 |
| 8,553,131 B2 | 10/2013 | Tseng et al. | |
| 8,714,843 B2 | 5/2014 | Woo | |
| 2002/0101041 A1* | 8/2002 | Kameyama | H01R 13/521 277/628 |
| 2006/0056077 A1 | 3/2006 | Johnston | |
| 2006/0171704 A1* | 8/2006 | Bingle | B60R 11/04 396/419 |
| 2011/0063498 A1* | 3/2011 | An | H04N 5/2252 348/375 |
| 2011/0096524 A1* | 4/2011 | Kameyama | H01R 13/506 361/818 |
| 2011/0279675 A1* | 11/2011 | Mano | G02B 13/001 348/148 |
| 2013/0242099 A1* | 9/2013 | Sauer | H04N 5/2251 348/148 |
| 2013/0293771 A1* | 11/2013 | Mori | H04N 5/2252 348/374 |

(Continued)

FOREIGN PATENT DOCUMENTS

WO WO 2012/015965 A1 2/2012
WO WO 2012/145313 A2 10/2012

OTHER PUBLICATIONS

International Search Report and Written Opinion, dated Oct. 28, 2016, in connection with PCT/US2016/049915, filed Sep. 1, 2016.

*Primary Examiner* — Shahbaz Nazrul
(74) *Attorney, Agent, or Firm* — Fay Sharpe LLP

(57) ABSTRACT

A camera module including a housing having an interior compartment and a lens bore extending from the interior compartment to an exterior of the housing, and a support member having a lens mount portion supporting a lens and an imager mount portion supporting an imager assembly. The support member is supported by the housing with at least a portion of the lens mount portion received in the lens bore, and the imager mount portion abuttingly engaged with a shoulder of the housing.

15 Claims, 4 Drawing Sheets

(56) References Cited

U.S. PATENT DOCUMENTS

| | | | | |
|---|---|---|---|---|
| 2014/0168507 A1* | 6/2014 | Renaud | ................ | H04N 5/2257 348/373 |
| 2014/0354878 A1* | 12/2014 | Winter | ................. | H04N 5/2252 348/374 |
| 2015/0029337 A1* | 1/2015 | Uchiyama | ............ | H04N 5/2252 348/148 |
| 2015/0319348 A1* | 11/2015 | Jung | ...................... | G03B 17/12 348/360 |
| 2016/0112607 A1* | 4/2016 | Yang | ................... | H04N 5/2252 348/373 |

* cited by examiner

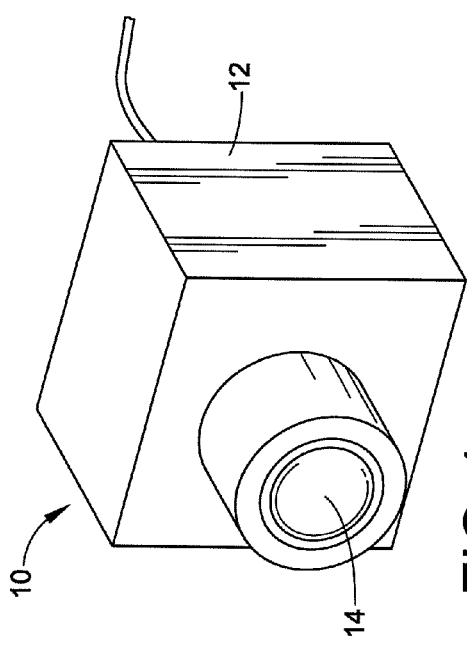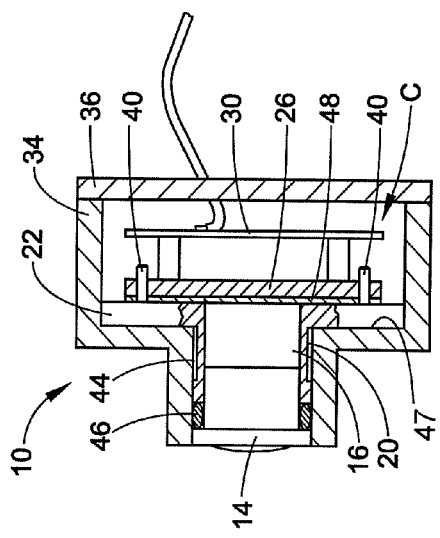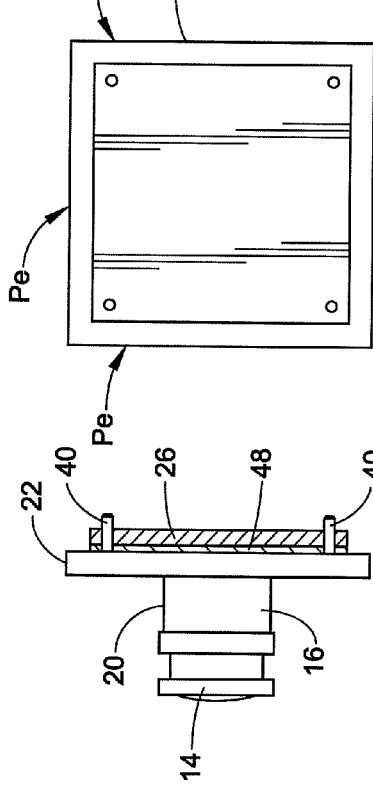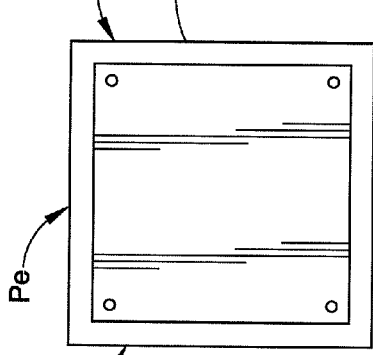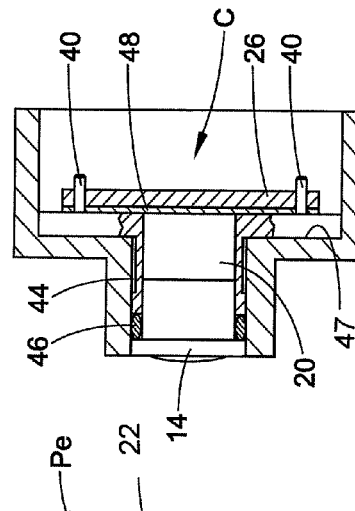

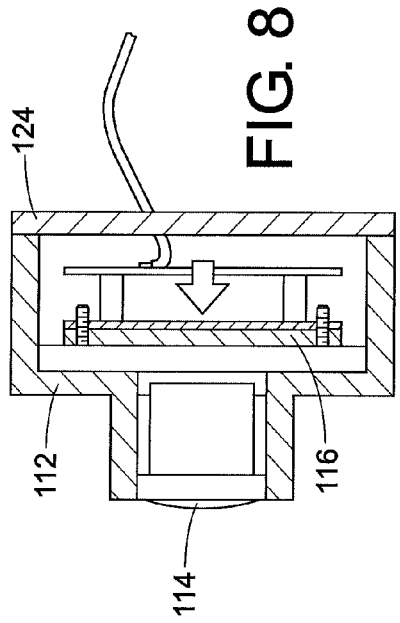
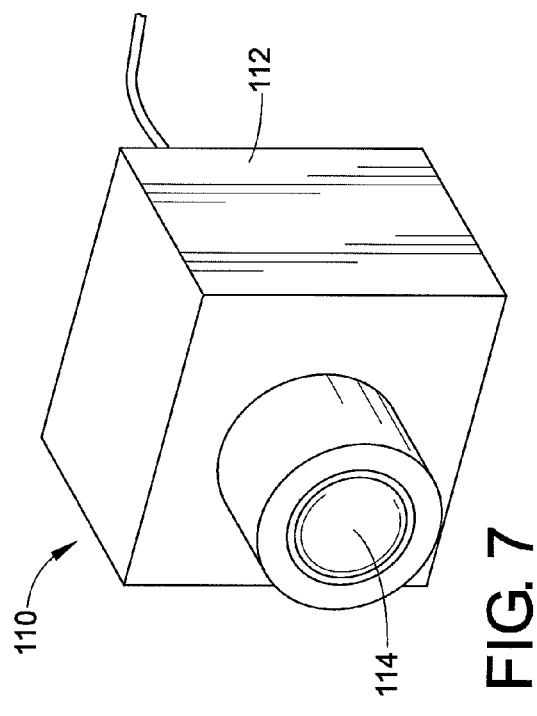
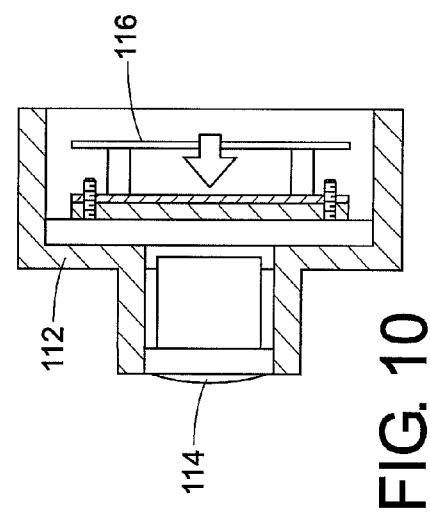
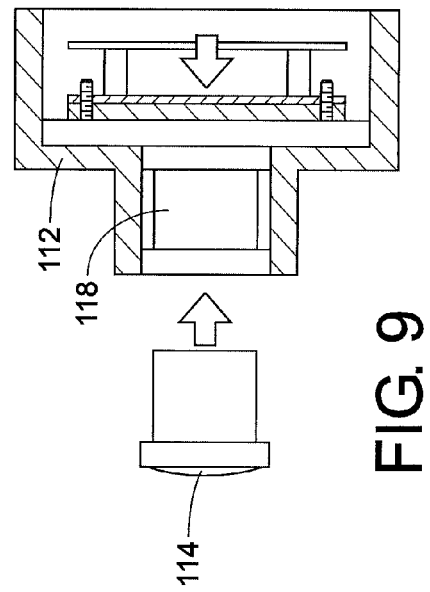
FIG. 7
FIG. 8
FIG. 9
FIG. 10

CAMERA MODULE HAVING COMPACT CAMERA SUBASSEMBLY INSERTABLE INTO THE CAMERA HOUSING

BACKGROUND

The present exemplary embodiment relates to imaging systems in general. It finds particular application in conjunction with methods and systems for mounting an optical axis of an optical lens in an accurate desired alignment with an optical imager, and will be described with particular reference thereto. However, it is to be appreciated that the present exemplary embodiment is also amenable to other like applications.

Increasingly, image sensing systems are being used for optical metrology (i.e., measurement) functions. For instance, image sensing systems may utilize various algorithms to calculate, inter alia, the angles, distances, curvatures, speeds, etc. of objects within an acquired image.

Such image sensing systems typically include a video camera, digital still camera or the like, which are capable of capturing images into digital signals (or potentially analog signals) for storage, manipulation and/or distribution. Such systems ordinarily include a lens or other image-forming element capable of capturing light from a scene/object and focusing/projecting that light onto a surface that is capable of sensing the light. This surface typically comprises an array of photo sensor elements, such as charge-coupled-devices ("CCDs") or complementary metal oxide semiconductor ("CMOS") photoreceptors.

These sensors typically comprise planar, rectangular matrices, or arrays, of photoelectric transducer elements fabricated on the surface of a semiconductor substrate, typically silicon, by various known photolithographic techniques, that are capable of converting the light energy incident upon them into electrical signals on an element-by-element, or pixel-by-pixel, basis. These signals, usually digital in nature, include information pertaining to, e.g., the intensity, color, hue, saturation, and other attributes of the incident light.

The sensor array substrate(s) is typically disposed on and electrically connected to a base substrate such as a printed circuit board (PCB). A lens structure disposed over the sensor array typically supports one or more optical elements. This lens structure typically mounts to the base substrate/PCB. The most common method for aligning the lens and optical sensor involves the lens and base substrate having corresponding, complementary mounting features adapted to engage each other such that, when engaged, the optical features of the sensor are aligned with the optical elements of the lens. Typically, the lens includes various projections arranged around its optical axis and the base substrate includes corresponding apertures or pedestals that mate with these projections.

In order to accurately align the lens and optical sensor, the tolerances of the individual components and the complementary mounting features need to be extremely tight. Maintaining such tight dimensional tolerances is difficult. Separate tolerances are present in the fabrication and assembly of the various components (e.g., optical properties of the lens elements, sensor to PCB mounting tolerances, lens to lens carrier mounting tolerances, etc.) and the final integration of these components (e.g., lens carrier to PCB mounting tolerances). Unless extremely tight dimensional tolerances are specified and maintained, during the fabrication and assembly of all of these components, tolerance stack ups tend to occur. Generally, such tolerance stack up can be maintained to within a few hundred microns in the Cartesian directions (e.g., XYZ directions) and to perhaps slightly more than 1° angularly about one or all of the Cartesian axes.

While such tolerances are acceptable for many applications, accurate optical metrology (i.e., measurement) functions typically require much tighter tolerances. To provide tighter tolerances, an active alignment process may be utilized where feedback from the optical sensor guides alignment. In such an active alignment method, the sensor is temporarily positioned loosely in about the desired position of alignment with the lens positioned loosely in about the desired position of alignment with the sensor. The sensor is temporarily connected to a display to output a test scene or pattern, and the relative position of the sensor or lens is adjusted by a human or machine until the image of the test pattern produced on the display subjectively matches the test pattern, whereupon the position of the sensor relative to the lens is then fixed permanently in place.

Active alignment typically requires multiple alignment and securing/gluing steps. For instance, one prior design utilizes a two piece lens mount carrier. The first piece is a lens mount with internal threads; the second piece is a mechanical stand-off for attachment to the PCB. First, the lens is focused by being threaded into or out of the lens mount in the Z direction. Then the lens and the lens mount assembly are moved in the XY directions on top of the mechanical stand-off to correct for any lateral misalignment. The process requires a 3-step gluing process that includes tacking the lens inside the threaded mount, tacking the lens mount on the stand-off, and removing the complete assembly from an alignment setup for the final gluing and re-enforcement.

BRIEF DESCRIPTION

In accordance with one aspect, a camera module comprises a housing having an interior compartment and a lens bore extending from the interior compartment to an exterior of the housing, and a support member having a lens mount portion supporting a lens and an imager mount portion supporting an imager assembly. The support member is nested in the housing with at least a portion of the lens mount portion extending into the lens bore, and the imager mount portion engaged with a shoulder of the housing in the interior compartment.

In an embodiment, at least two opposite peripheral edges of the imager mount portion of the support member are abuttingly engaged with respective interior surfaces of the housing adjacent the shoulder, thereby restricting relative movement between the housing and the support member. The imager mount portion extends beyond the imager assembly such that the at least two opposite peripheral edges of the imager mount surface are spaced apart from respective edges of the imager assembly. The interior compartment of the housing and the imager mount portion of the support member have complementary cross-sectional shapes such that a major portion of a peripheral edge of the imager mount portion is engaged with the housing. A seal element is disposed between the housing and the support member. The seal element includes an O-ring interposed between the lens bore of the housing and the lens mount portion of the support member. The lens bore and the lens mount portion of the support member are cylindrical. The lens and the imager assembly are optically aligned, the alignment being maintained by a rigid connection between the lens and imager assembly to the support member. The support member is a monolithic structure.

In accordance with another aspect, a method of assembling a camera module comprises providing a camera subassembly including a support member having a lens mount portion supporting a lens and an imager mount portion supporting an imager assembly, and inserting the camera subassembly into a housing having an interior compartment and a lens bore extending from the interior compartment to an exterior of the housing. The inserting the camera subassembly includes positioning the camera subassembly with at least a portion of the lens mount portion extending into the lens bore of the housing, and the imager mount portion engaged with a shoulder of the housing.

The imager mount portion can extend beyond the imager assembly such that the at least two opposite peripheral edges of the imager mount surface are spaced apart from respective edges of the imager assembly, and the at least two opposite peripheral edges of the imager mount portion of the support member can be abuttingly engaged with respective interior surfaces of the housing adjacent the shoulder, thereby restricting relative movement between the housing and the support member. The interior compartment of the housing and the imager mount portion of the support member can have complementary cross-sectional shapes such that a major portion of a peripheral edge of the imager mount portion is engaged with the housing. The method can further include interposing a seal element between the housing and the support member. The seal element can include an O-ring interposed between the lens bore of the housing and the lens mount portion of the support member. The lens bore and the lens mount portion of the support member can be cylindrical. The method can further comprise optically aligning the lens and the imager assembly. The support member can be a monolithic structure.

BRIEF DESCRIPTION OF THE DRAWINGS

FIG. 1 is a perspective view of an exemplary camera module in accordance with the present disclosure;

FIG. 2 is a partial cutaway view of the camera module of FIG. 1 with a portion of the housing removed to expose certain features;

FIG. 4 is a side view of an exemplary camera subassembly in accordance with the present disclosure;

FIG. 5 is an end view of the camera subassembly;

FIG. 6 is partially assembled view of the camera module of FIG. 1;

FIG. 7 is a perspective view of another exemplary camera module in accordance with the present disclosure;

FIG. 8 is a partial cutaway view of the camera module of FIG. 7 with a portion of the housing removed to expose certain features;

FIG. 9 is an exploded view of a camera subassembly;

FIG. 10 is a partially assembled view of the camera module of FIG. 7; and,

DETAILED DESCRIPTION

Figure 3:
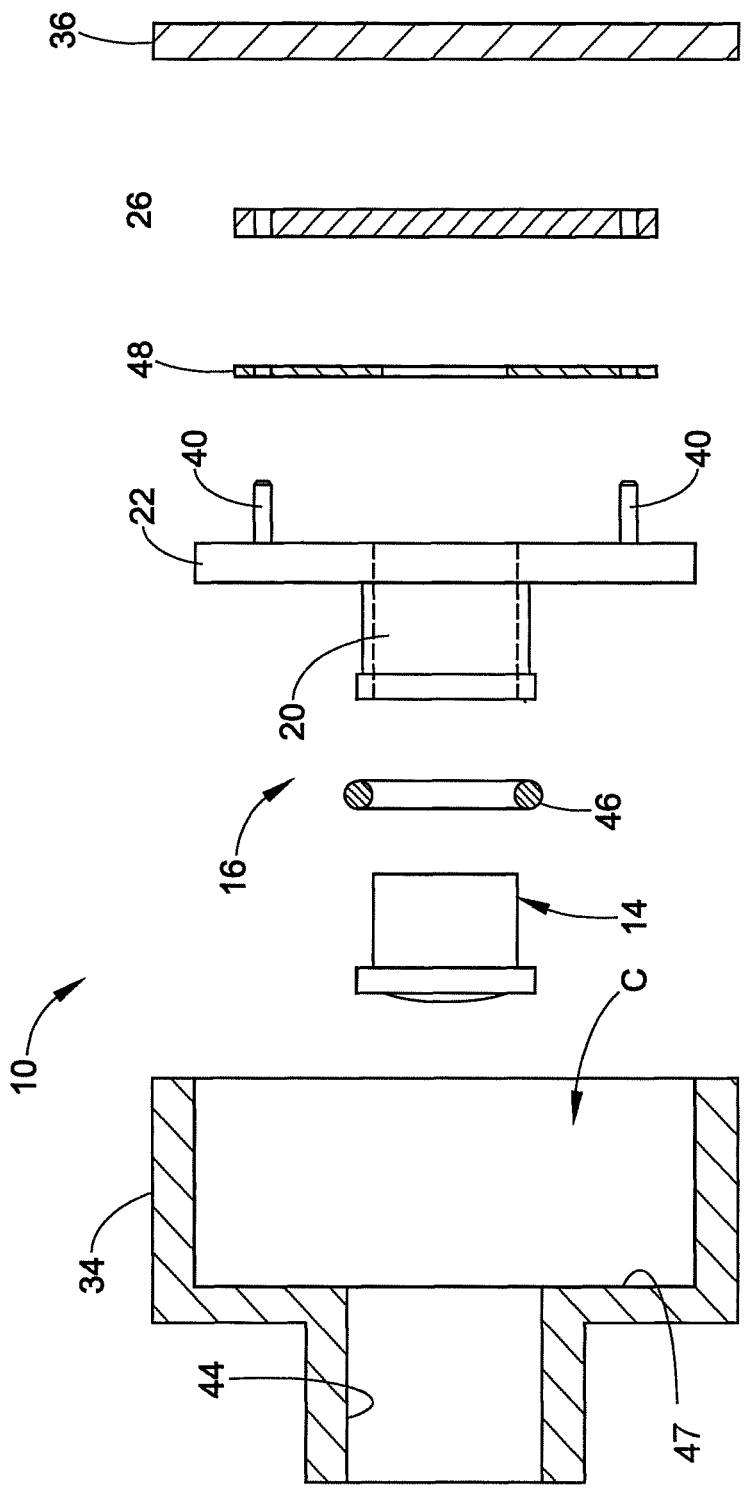
FIG. 3 is an exploded view of the camera module of FIGS. 1 and 2.

Reference will now be made to the accompanying drawings, which at least assist in illustrating the various pertinent features of the presented inventions. In this regard, the following description is presented for purposes of illustration and description. Furthermore, the description is not intended to limit the disclosed embodiments of the inventions to the forms disclosed herein. Consequently, variations and modifications commensurate with the following teachings, and skill and knowledge of the relevant art, are within the scope of the presented inventions.

Provided herein are systems and methods for mounting a lens or other image forming element relative to an optical imager/sensor array in precise optical alignment. The provided systems and methods simplify the connection of these elements and substantially eliminates the tolerance stack up issues associated with systems and methods of the prior art.

With reference to FIGS. 1-6, and initially to FIG. 1, an exemplary camera module is illustrated and identified generally by reference numeral 10. The camera module 10 generally comprises a housing 12 in which a lens 14 and related image circuitry is supported. As will be appreciated, the housing 12 can be made of any suitable material or combination of materials including, for example, plastics, metals, composites, etc.

With reference to FIG. 2, which is a partial cutaway view with a portion of the housing 12 removed, further components of the camera module 10 will be described. The camera module 10 includes a support member 16 having a lens mount portion 20 and an imager mount portion 22. The support member 16 of the illustrated exemplary embodiment is of a unitary, one-piece construction. For example, the support member 16 can be of a monolithic molded plastic construction.

The lens mount portion 20 is generally cylindrical and configured to receive or otherwise support the generally cylindrical lens 14. The lens 14 can be secured to the lens mount portion 20 with a suitable adhesive, or in other suitable manners (e.g., such as via mechanical connection such as press-fit or threaded connection). The imager mount portion 22 generally comprises a flat, rectangular surface on which an imager assembly 26 is mounted. It will be appreciated that the term imager assembly, as used herein, may include a substrate on which image sensing circuitry (and/or other circuitry) is disposed and is intended to encompass any and all such structures.

The imager assembly 26 can be mounted to the imager mount portion 22 in any suitable manner, such as via staking and/or with suitable adhesives or other compounds. In some embodiments, a gasket may be interposed between the imager assembly 26 and the imager mount portion 22 of the support member 16. Together, the lens 14, the support member 16 and the imager assembly 26 form a camera subassembly that is insertable into the housing in a nesting fashion.

It will be appreciated that various other components may be contained or supported within the housing 12 depending on a particular construction of a given camera module. Such components can be directly or indirectly mounted to the support member 16, or the housing 12. For example as shown in FIG. 2, an additional circuit board 30 is mounted to the imager assembly 26.

Turning to FIG. 3, which is an exploded view of the camera module 10 of FIGS. 1 and 2, and with additional reference to FIG. 4-6, the assembly of the camera module 10 will be described. It will be appreciated that the housing 12 generally comprises two components—a main housing component 34 having an interior compartment C and a lens bore 44, and a rear cover 36 for enclosing the interior compartment C. The rear cover 36 is generally fixed (and/or sealed) to the main housing component 34 after assembly of the lens and related components within the main housing component 34. It should be understood that additional housing components can be provided, as necessary. However, the two housing component configuration shown in the present embodiment is relatively easy to assemble and minimizes sealing requirements.

To assemble the camera module 10, the support member 16 is first fitted with the lens 14 in any suitable manner. As noted above, the lens 14 may be screwed or otherwise mechanically fixed to the support member 16. In other embodiments, the lens 14 can be fixed to the support member 16 with adhesives. The imager assembly 26 is then positioned on the imager mount surface 22 and secured thereto. Prior to securing the imager assembly 26 to the image mount portion 22 via the posts 40, the imager assembly 26 is optically aligned with the optical axis of the lens 14. A wide variety of methods and techniques can be employed for aligning the imager assembly 26 with the lens 14. In the illustrated embodiment, the imager assembly 26 is secured to the image mount portion 22 via posts 40 and/or suitable adhesive. The posts 40 mate with corresponding apertures on the imager assembly (not shown) to align the imager assembly 26 with the lens 14. It will be appreciated that a wide range of techniques can be employed for securing the imager assembly 26 to the imager mount portion 22.

With additional reference to FIGS. 4 and 5, the imager mount portion 22 generally includes a planar surface having peripheral edge Pe that extends beyond the edges of the imager assembly 26. As such, the imager assembly 26 is isolated from the housing 12 when the support member 16 is installed therein. This allows the imager assembly 26 to move independently of the housing 12 and thereby maintain alignment with the lens 14. Unlike prior art designs, wherein an imager assembly is typically mounted to a housing component, the present disclosure sets forth a design wherein the imager assembly and lens are mounted to a common component (support member 16) thereby eliminating tolerance stack up and thereby increasing and/or maintaining precise alignment of the components. Furthermore, tolerance stack up where the lens is interfacing with housing is eliminated since tolerance is taken up in the imager assembly.

The camera subassembly is inserted into the rear of the main housing component 34 in nesting fashion such that the lens mount portion 20 of the support member 16 extends into the lens bore 44 of the main housing component 34, and the imager mount portion 22 abuts a shoulder 47 of the housing surrounding the lens bore 44. The shoulder 47 extends radially outwardly from a base of the lens bore 44 to side walls of the main housing component 34. The support member 16 can be sealed to the housing in various manners. In the illustrated embodiment, the lens mount portion 20 is sealed to the housing with an O-ring 46, while imager mount portion 22 is sealed to the housing with gasket 48. Other seal arrangements are also possible.

The imager mount portion 22 is dimensioned to be closely received within the main housing component 34 such that the outer peripheral edges of the imager mount portion 22 abuttingly engage the sides of the main housing component 34. In this regard, the imager mount portion 22 can form a friction fit with the main housing component 34. By sizing the imager mount portion 22 in such manner, the imager assembly 26 mounted thereon is isolated from the main housing component 34. The support member 16 can be secured within the main housing component 34 in any suitable fashion such as with mechanical fasteners including screws and the like, and/or with suitable adhesives, or can be sandwiched between housing component 34 and rear cover 36.

Once the support member 16 is mounted within the main housing component 34, the rear cover 36 is installed on the main housing 34 to thereby enclose the camera subassembly within the housing 12. It will be appreciated that the rear cover 36 can be sealed to the main housing component 34 with a gasket (not shown) or via other methods, to thereby seal the interior of the housing 12.

Turning now to FIGS. 7-10, another exemplary camera module in accordance with the present disclosure is illustrated and identified generally by reference numeral 110. The camera module 110 includes a housing 112 in which a lens 114 and related image circuitry is supported. As will be appreciated, the housing 112 can be made of any suitable material or combination of materials including, for example, plastics, metals, composites, etc.

With reference to FIG. 8, the camera module 110 is similar to camera module 10, except that the support member 16 is omitted. Instead, the housing 112 directly supports the lens 114 and an imager assembly 116.

Figure 11:
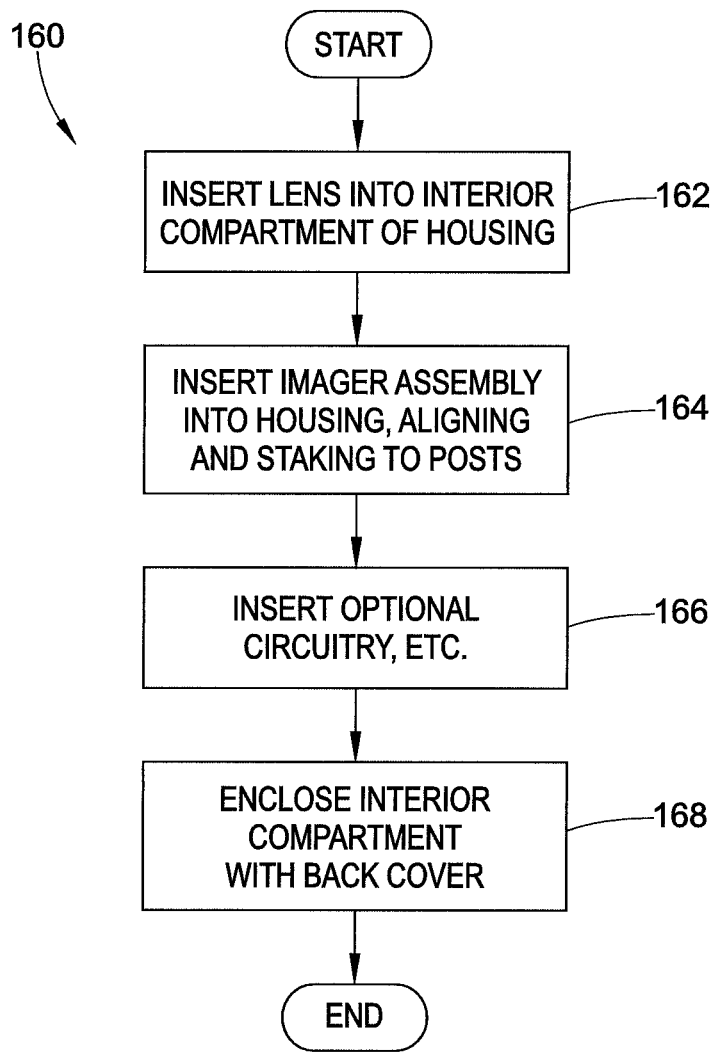
FIG. 11 is a flowchart of an exemplary method in accordance with the present disclosure.

FIGS. 9 and 10 illustrate an exemplary manner of assembling the camera module 110. In this regard, the lens 114 (and associated housing) is inserted into a lens bore 118 of housing 112 and secured and/or sealed thereto in any suitable fashion, such as described above in relation to the lens 14. The imager assembly 116 is then inserted into the housing 112, aligned with the lens 114, and secured to the housing 112. In this embodiment, posts 140 extend from housing 112 for locating and/or securing the imager assembly 116 thereto. Imager assembly 116 is sealed to the housing 114 via gasket 142. Like the embodiment of FIGS. 1-6, additional circuitry 146 can be supported by and/or included with, the imager assembly 116. A rear cover 124 is then secured to the housing 112 to enclose the imager assembly and related components therein. The foregoing exemplary method is illustrated in the flowchart 160 (process steps 162, 164, 166, 168) of FIG. 11.

The camera module 110 utilizes a common component, the housing 112, to support both the lens 114 and the imager assembly 116, thereby reducing/eliminating tolerance stackup in alignment of these components.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A camera module comprising:
    a housing having an interior compartment, a lens bore extending from the interior compartment to an exterior of the housing, and a shoulder at least partially surrounding the lens bore and forming part of the interior compartment; and
    a support member having a lens mount portion supporting a lens and an imager mount portion supporting an imager assembly;
    wherein the support member is nested within the housing with at least a portion of the lens mount portion extending into the lens bore, and the imager mount portion abuttingly engaged with the shoulder of the housing in the interior compartment; and wherein at least two opposite peripheral edges of the imager mount portion of the support member are engaged with respective interior surfaces of the housing adjacent the shoulder, thereby restricting relative movement between the housing and the support member.

2. The camera module of claim 1, wherein the imager mount portion extends beyond the imager assembly such that the at least two opposite peripheral edges of the imager mount portion are spaced apart from respective edges of the imager assembly.

3. The camera module of claim 2, wherein the interior compartment of the housing and the imager mount portion of the support member have complementary cross-sectional shapes such that a major portion of a peripheral edge of the imager mount portion is engaged with the housing.

4. The camera module of claim 1, further comprising a seal element disposed between the housing and the support member.

5. The camera module of claim 4, wherein the seal element includes an O-ring interposed between the lens bore of the housing and the lens mount portion of the support member.

6. The camera module of claim 5, wherein the lens bore and the lens mount portion of the support member are cylindrical.

7. The camera module of claim 1, wherein the lens and the imager assembly are optically aligned, said optical alignment maintained by a rigid connection between the lens and imager assembly to the support member.

8. The camera module of claim 1, wherein the support member is a monolithic structure.

9. A method of assembling a camera module comprising:
providing a camera subassembly including a support member having a lens mount portion supporting a lens and an imager mount portion supporting an imager assembly;
inserting the camera subassembly into a housing having an interior compartment, a lens bore extending from the interior compartment to an exterior of the housing, and a shoulder at least partially surrounding the lens bore and forming part of the interior compartment;
wherein the inserting the camera subassembly includes positioning the camera subassembly with at least a portion of the lens mount portion extending into the lens bore of the housing, and the imager mount portion abuttingly engaged with the shoulder of the housing in the interior compartment; and
wherein the imager mount portion extends beyond the imager assembly such that the at least two opposite peripheral edges of the imager mount portion are spaced apart from respective edges of the imager assembly, and wherein the least two opposite peripheral edges of the imager mount portion of the support member are engaged with respective interior surfaces of the housing adjacent the shoulder, thereby restricting relative movement between the housing and the support member.

10. The method of claim 9, wherein the interior compartment of the housing and the imager mount portion of the support member have complementary cross-sectional shapes such that a major portion of a peripheral edge of the imager mount portion is engaged with the housing.

11. The method of claim 9, further comprising interposing a seal element between the housing and the support member.

12. The method of claim 11, wherein the seal element includes an O-ring interposed between the lens bore of the housing and the lens mount portion of the support member.

13. The method of claim 12, wherein the lens bore and the lens mount portion of the support member are cylindrical.

14. The method of claim 9, further comprising optically aligning the lens and the imager assembly.

15. The method of claim 9, wherein the support member is a monolithic structure.

* * * * *